US012346521B2

(12) United States Patent
Zhou

(10) Patent No.: US 12,346,521 B2
(45) Date of Patent: Jul. 1, 2025

(54) ANTI-MISTOUCH METHOD AND ELECTRONIC DEVICE FOR FOLDABLE SCREENS BASED ON FOLDING ANGLE

(71) Applicant: VIVO MOBILE COMMUNICATION CO., LTD., Dongguan (CN)

(72) Inventor: Wei Zhou, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 18/534,544

(22) Filed: Dec. 8, 2023

(65) Prior Publication Data

US 2024/0134480 A1 Apr. 25, 2024
US 2024/0231538 A9 Jul. 11, 2024

Related U.S. Application Data

(63) Continuation of application No. PCT/CN2022/097133, filed on Jun. 6, 2022.

(30) Foreign Application Priority Data

Jun. 9, 2021 (CN) .......................... 202110641228.9

(51) Int. Cl.
*G06F 3/044* (2006.01)
*G06F 1/16* (2006.01)
*G06F 3/041* (2006.01)

(52) U.S. Cl.
CPC .......... *G06F 3/0418* (2013.01); *G06F 1/1643* (2013.01); *G06F 1/1652* (2013.01); *G06F 1/1677* (2013.01); *G06F 3/044* (2013.01); *G06F 1/1641* (2013.01); *G06F 3/04186* (2019.05); *G06F 2203/04102* (2013.01)

(58) Field of Classification Search
CPC .... G06F 1/1643; G06F 1/1652; G06F 1/1677; G06F 1/1641; G06F 3/0418; G06F 3/04186; G06F 2203/04102; G06F 3/044
See application file for complete search history.

(56) References Cited

U.S. PATENT DOCUMENTS 10,712,862 B1* 7/2020 Kang ................. G06F 3/044
11,209,914 B1* 12/2021 Hu ..................... G06F 3/044
2018/0088633 A1* 3/2018 Whitman ............ G06F 3/0446
(Continued)

FOREIGN PATENT DOCUMENTS

CN 108459797 A 8/2018
CN 110392161 A 10/2019
(Continued)

OTHER PUBLICATIONS

International Search Report issued in corresponding International Application No. PCT/CN2022/097133, mailed Aug. 23, 2022, 4 pages.
(Continued)

*Primary Examiner* — Adam J Snyder
(74) *Attorney, Agent, or Firm* — IPX PLLC

(57) ABSTRACT

An anti-mistouch method and apparatus, and an electronic device, are provided. The method includes: determining, by an electronic device, a folding angle of a foldable screen; determining a target region of the foldable screen according to the folding angle; and disabling a touch response function of the target region of the foldable screen.

20 Claims, 9 Drawing Sheets

(56) References Cited

U.S. PATENT DOCUMENTS

| | | | |
|---|---|---|---|
| 2019/0042042 A1* | 2/2019 | Hei | G06F 3/0446 |
| 2020/0073446 A1 | 3/2020 | Wu et al. | |
| 2021/0132730 A1* | 5/2021 | Huang | G06F 3/0443 |
| 2022/0137774 A1* | 5/2022 | Park | G06F 3/0443 |
| | | | 345/174 |
| 2022/0334677 A1* | 10/2022 | Kano | G06F 3/0445 |

FOREIGN PATENT DOCUMENTS

| | | |
|---|---|---|
| CN | 111147629 A | 5/2020 |
| CN | 111610874 A | 9/2020 |
| CN | 112835462 A | 5/2021 |
| CN | 113296636 A | 8/2021 |
| WO | 2020258950 A1 | 12/2020 |

OTHER PUBLICATIONS

First Office Action issued in related Chinese Application No. 202110641228.9, mailed Mar. 2, 2022, 10 pages.
Search Report issued in related Chinese Application No. 202110641228.9, mailed Oct. 9, 2022, 2 pages.

\* cited by examiner

ANTI-MISTOUCH METHOD AND ELECTRONIC DEVICE FOR FOLDABLE SCREENS BASED ON FOLDING ANGLE

CROSS-REFERENCE TO RELATED APPLICATIONS

This application is a continuation of International Application No. PCT/CN2022/097133, filed on Jun. 6, 2022, which claims priority to Chinese Patent Application No. 202110641228.9, filed Jun. 9, 2021. The entire contents of each of the above-identified applications are expressly incorporated herein by reference.

TECHNICAL FIELD

This application is directed to the field of computer technologies, and specifically relates to an anti-mistouch method and apparatus, and an electronic device.

BACKGROUND

With the development of technologies, display screens of more and more electronic devices are foldable screens, which are also touch screens. A user may operate an electronic device by touching the screen. A finger of the user may touch the screen of the foldable screen in a process of folding the foldable screen, resulting in accidental touch.

SUMMARY

Embodiments of this application provide an anti-mistouch method and apparatus, and an electronic device.

According to a first aspect, an embodiment of this application provides an anti-mistouch method, and the method includes:
  determining a folding angle of a foldable screen of an electronic device;
  determining a target region of the foldable screen according to the folding angle; and
  disabling a touch response function of the target region of the foldable screen.

According to a second aspect, an embodiment of this application provides an anti-mistouch apparatus, including:
  a first determining module, configured to determine a folding angle of a foldable screen of an electronic device;
  a second determining module, configured to determine a target region of the foldable screen according to the folding angle; and
  a disabling module, configured to disable a touch response function of the target region of the foldable screen.

According to a third aspect, an embodiment of this application provides an electronic device. The electronic device includes a processor, a memory, and a program or an instruction that is stored in the memory and that can be run on the processor, where when the program or the instruction is executed by the processor, the steps of the method in the first aspect are implemented.

According to a fourth aspect, an embodiment of this application provides a readable storage medium. The readable storage medium stores a program or an instruction, and the program or the instruction is executed by a processor to implement the steps of the method in the first aspect.

According to a fifth aspect, an embodiment of this application provides a chip. The chip includes a processor and a communication interface, the communication interface is coupled to the processor, and the processor is configured to run a program or an instruction to implement the method in the first aspect.

According to a sixth aspect, a computer program/program product is provided, where the computer program/program product is stored in a non-transient storage medium, and the program/program product is executed by at least one processor to implement the steps of the method in the first aspect.

DETAILED DESCRIPTION

The following describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

In the specification and claims of this application, the terms "first," "second," and the like are intended to distinguish between similar objects but do not describe a specific order or sequence. It should be understood that, data used in such a way are interchangeable in proper circumstances, so that the embodiments of this application can be implemented in an order other than the order illustrated or described herein. Objects classified by "first," "second," and the like are usually of a same type, and the number of objects is not limited. For example, there may be one or more first objects. In addition, in the specification and the claims, "and/or"

represents at least one of connected objects, and a character "/" generally represents an "or" relationship between associated objects.

With reference to the accompanying drawings, an anti-mistouch method provided in the embodiments of this application is described in detail by using specific embodiments and application scenarios.

Figure 1:
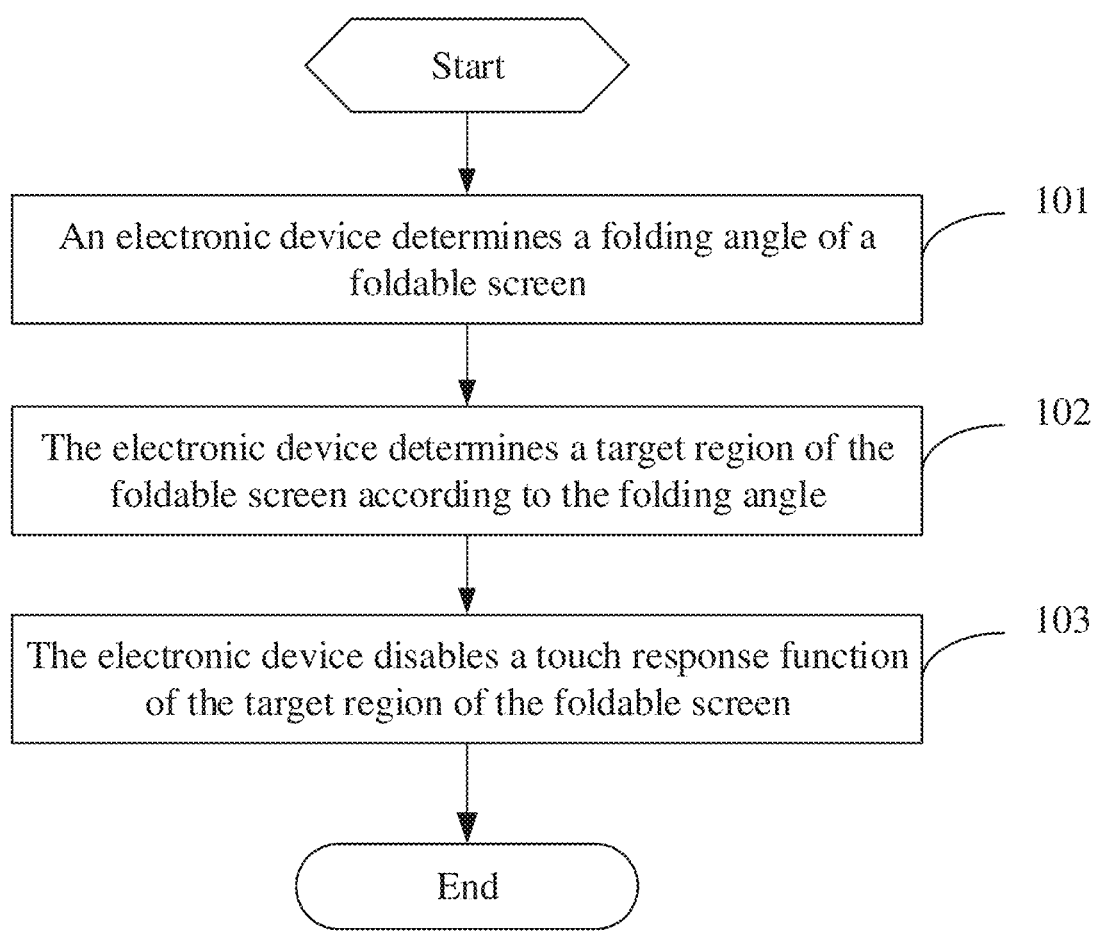
FIG. 1 is a flowchart of an anti-mistouch method according to an embodiment of this application.

FIG. 1 is a flowchart of an anti-mistouch method according to an embodiment of this application. As shown in FIG. 1, the anti-mistouch method provided in this embodiment includes the following steps:

Step 101: An electronic device determines a folding angle of a foldable screen.

In this step, the folding angle may be determined in an existing manner. For example, the folding angle is detected in a manner of adding a sensor, or the folding angle is detected in another manner. For a manner of determining the folding angle provided in this embodiment of this application, refer to the following descriptions for details.

Step 102: The electronic device determines a target region of the foldable screen according to the folding angle.

Different target regions of the foldable screen may be determined according to a value of the folding angle. For example, if the folding angle is small and a user is less likely to operate the foldable screen, the target region may be set to be large, for example, all regions of the foldable screen are determined as the target region. If the folding angle is large and a user is more likely to operate the foldable screen, the target region may be set to be small, for example, a region at an edge of the foldable screen is determined as the target region.

Step 103: The electronic device disables a touch response function of the target region of the foldable screen.

The touch response function of the target region of the foldable screen is disabled. For example, output of a scan signal of the target region is stopped. In this case, no signal change is generated on touch in the target region, so that accidental touch can be avoided, and power consumption caused by constantly scanning to detect touch can be reduced; or output of a scan signal of the target region is not stopped, and a touch scan signal of the target region is received but is not responded to, so that accidental touch can be avoided. As shown in FIG. 2*i*, a shadow line is a closed scanning channel. The user triggers a region in which the scanning channel is located, and the electronic device does not respond, so that accidental touch can be avoided.

In this embodiment, an electronic device determines a folding angle of a foldable screen; determines a target region of the foldable screen according to the folding angle; and disables a touch response function of the target region of the foldable screen. The target region is determined according to the folding angle, so that the touch response function of the foldable screen in the target region is disabled, thereby effectively avoiding accidental touch.

This embodiment of this application provides a manner of determining a folding angle, that is, determining the folding angle of the foldable screen of the electronic device, including:

obtaining output data of a sensor disposed on the foldable screen; and determining the folding angle of the foldable screen according to the output data.

It can be learned from a principle of a capacitive screen that each output signal (Transmitter (TX)) sensor is connected to one ground capacitor, and the ground capacitor is fixed during delivery of the module, and is strongly related to a structure, for example, a capacitor A, a capacitor B, and a capacitor C shown in FIG. 2. Software is used to set some TX sensors of the foldable screen to be grounded and some TX sensors to be not grounded. As shown in FIG. 2*a*, the software is used to set a TX sensor on a left half screen of the foldable screen to be grounded and a TX sensor on a right half screen to be not grounded. A TX marked with ground (GND) indicates a ground state. In FIG. 2, a, b, and c are capacitors, and r1, r2, and r3 are output data. Capacitance values of ground capacitors of a TX1 sensor, a TX2 sensor, and a TX3 sensor on the right half screen change, and output data collected in a self-contained scanning manner changes in this case. FIG. 2*b* is a schematic diagram of a detection loop in which the TX1 sensor is located, and a loop is formed between a line in which the TX1 sensor on the right half screen is located and a line in which the sensor on the left half screen is located. As shown in FIG. 2*b*, raw data (that is, output data) is a final collected data value. When the folding angle is smaller, a distance between the left half screen and the right half screen becomes smaller, and a capacitance value of the capacitor a becomes larger. If the capacitance value of the capacitor a becomes larger, a signal output by TX1 flows more from a j loop to the earth, and an output data value Raw of an i loop decreases. The folding angle of the foldable screen may be determined according to the output data of the TX sensor. In this application, the output data of the sensor may be output data of an output signal (TX) sensor.

In the foregoing manner of determining the folding angle of the foldable screen, the folding angle can be detected based on the sensor of the foldable screen without an additional sensor, thereby effectively reducing manufacturing costs of the electronic device and reducing power consumption.

As described above, the obtaining output data of a sensor disposed on the foldable screen includes:

obtaining M sets of data at M consecutive sampling moments, where each set of data includes output data of U sensors collected at one sampling moment, where the U first sensors are sensors located in a first region, and a ratio of distances between the U first sensors and an intermediate line is within a first preset ratio range, the intermediate line divides the foldable screen into the first region and a second region, the second region includes U second sensors, the U first sensors and the U second sensors are symmetrical with the intermediate line as a symmetric axis, the U first sensors are not grounded, the U second sensors are grounded, M is an integer greater than or equal to 2, and U is an integer greater than or equal to 2; and correspondingly, the determining the folding angle of the foldable screen according to the output data includes:

determining the folding angle of the foldable screen according to the M sets of data.

In some implementations, one set of data is obtained at each sampling moment, where the set of data includes output data of the U first sensors, and then the folding angle of the foldable screen is determined based on the M sets of data. The first preset ratio may be set according to an actual situation, and is not limited herein. The U first sensors are not grounded, the U second sensors are grounded, and two sensors in the U first sensors and the U second sensors and that are symmetrical with the intermediate line as a symmetric axis may form a loop. For details, refer to the foregoing related descriptions shown in FIG. 2*b*.

The following uses three output signal sensors as an example to describe the foregoing process.

Figure 2A:
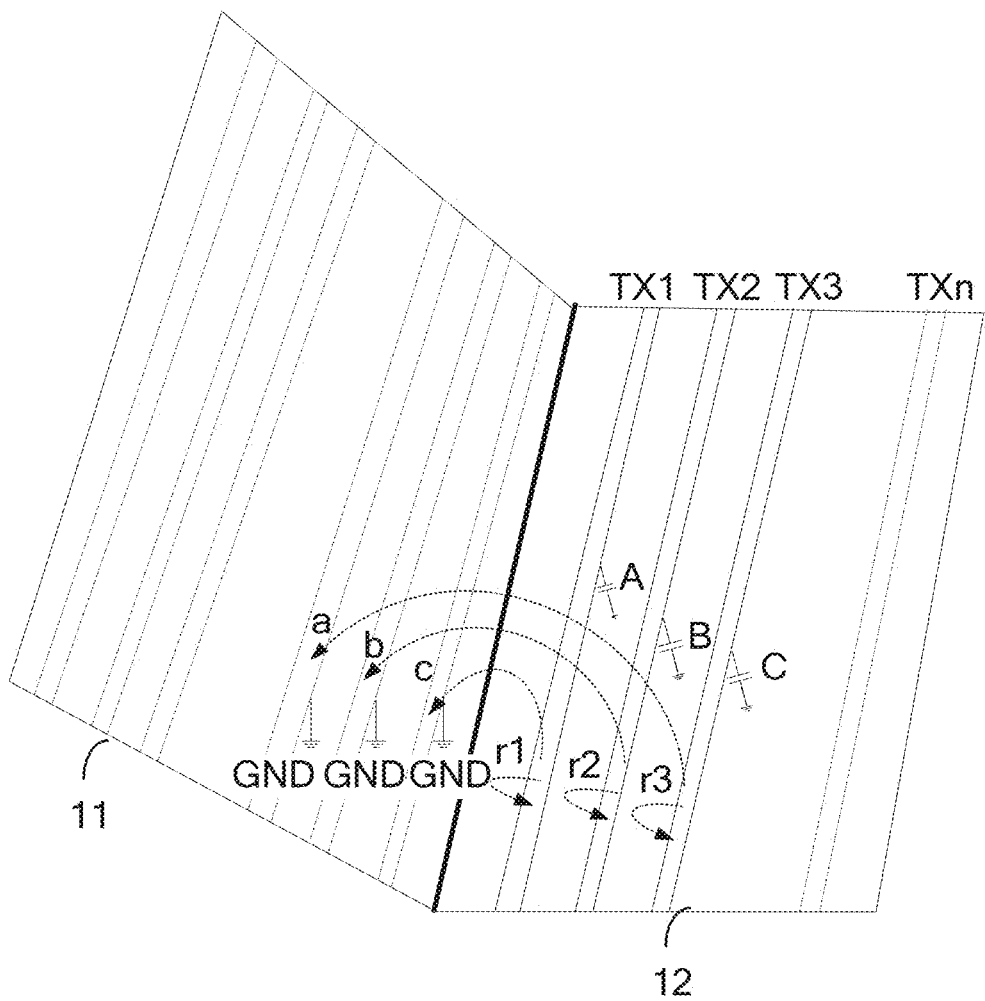
FIG. 2a is a schematic grounding diagram of an output signal sensor of a foldable screen according to an embodiment of this application.
Figure 2B:
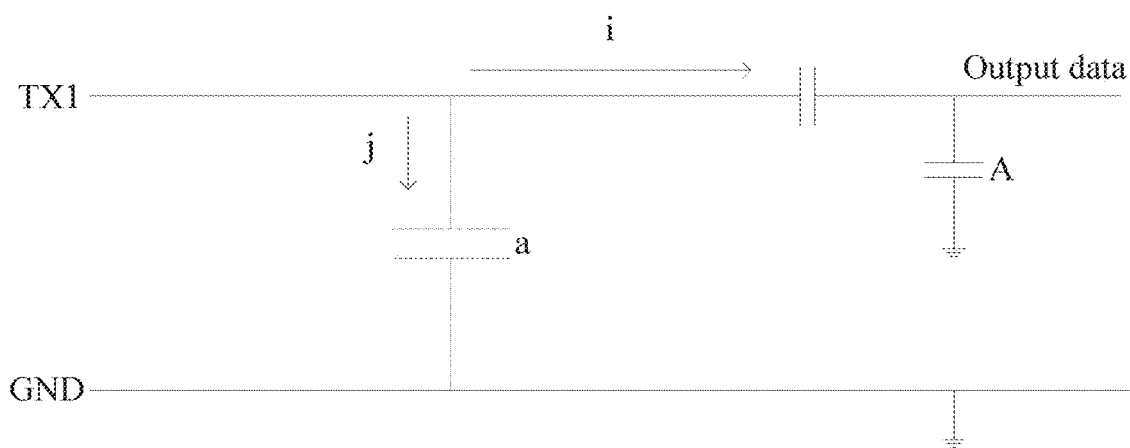
FIG. 2b is a circuit diagram of a detection loop of an output signal sensor of a foldable screen according to an embodiment of this application.
Figure 2C:
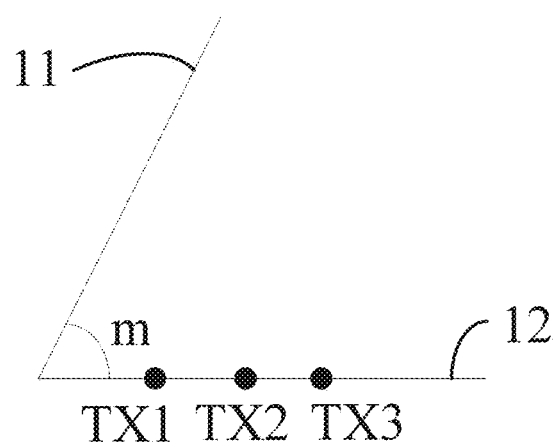
FIG. 2c is a first schematic diagram of a folding angle according to an embodiment of this application.
Figure 2D:
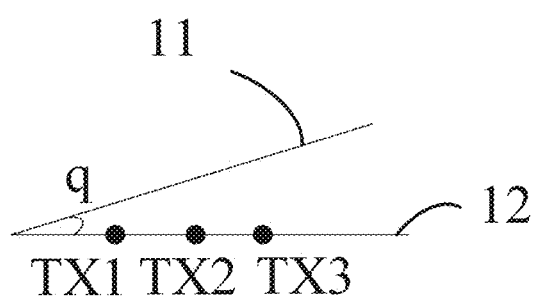
FIG. 2d is a second schematic diagram of a folding angle according to an embodiment of this application.

When the folding angle of the foldable screen is m, a schematic diagram of the left and right half screens is shown in FIG. 2c and FIG. 2d. In the figure, a reference numeral 11 represents the left half screen, and a reference numeral 12 represents the right half screen. A black dot represents a location of a signal output channel in which a sensor is located.

When the folding angle is m, the output data received from TX1, TX2, and TX3 is respectively Raw1(m), Raw2(m), and Raw3(m).

When the folding angle is y, the output data received from TX1, TX2, and TX3 is respectively Raw1(y), Raw2(y), and Raw3(y).

Figure 2E:
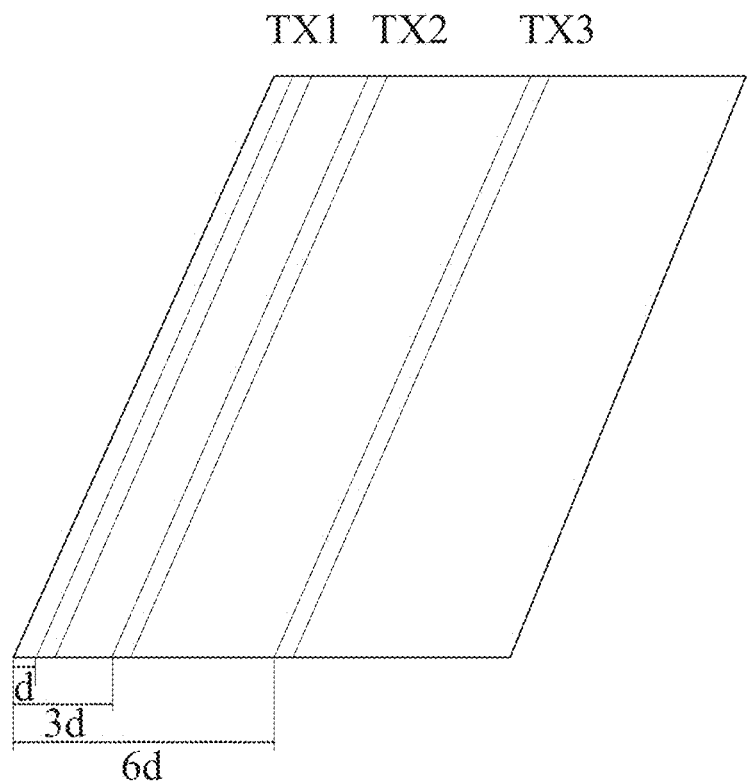
FIG. 2e is a schematic diagram of a location of a channel corresponding to an output signal sensor according to an embodiment of this application.

In the process in which the folding angle changes from m to y, the output data received from TX1, TX2, and TX3 changes accordingly. For a same angle, because distances between channels corresponding to TX1, TX2, and TX3 and a medium line (that is, an intermediate line) of the foldable screen are different, variations of the output data received from TX1, TX2, and TX3 are also different. In this embodiment, a location distance between the channels of TX1, TX2, and TX3 is d:3d:6d, that is, 1:2:3. In other words, the first preset ratio may be 1:2:3. As shown in FIG. 2e, a capacitance variation caused by an angle change can be more sensitively detected, thereby effectively avoiding interference caused by accidental touch or the like.

Figure 2F:
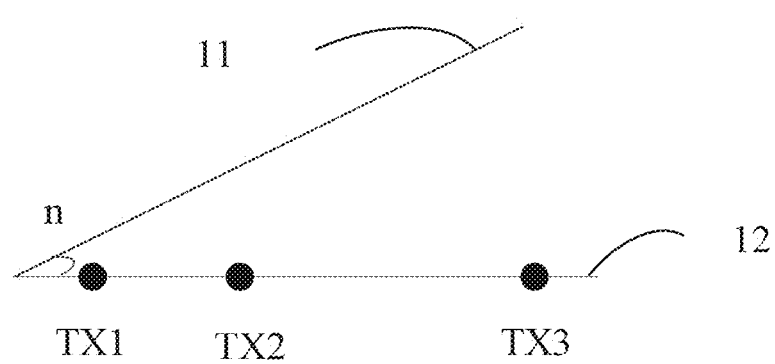
FIG. 2f is a third schematic diagram of a folding angle according to an embodiment of this application.

As shown in FIG. 2f, when the folding angle is n, a value of the data Raw1 obtained from TX1 is twice that of Raw2 without considering signal attenuation, and a value of the data Raw2 obtained from TX2 is approximately twice that of Raw3 received from TX3 without considering attenuation, that is, proportional to a distribution distance of each TX, and a ratio is:

Raw1:Raw2:Raw3=4:2:1.

Figure 2G:
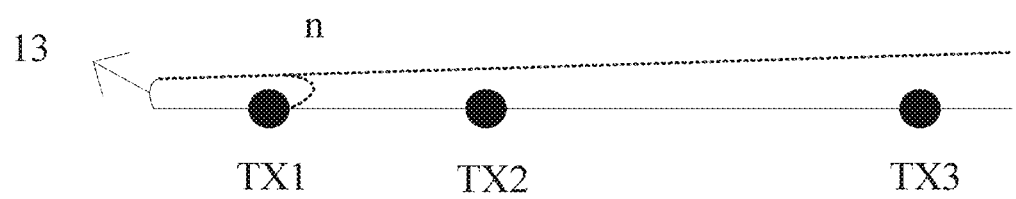
FIG. 2g is a fourth schematic diagram of a folding angle according to an embodiment of this application.

As a structure of the foldable screen requires a hinge to ensure complete folding, as shown in FIG. 2g, a reference numeral 13 represents the hinge. When the folding angle is actually smaller, a value received from TX no longer shows a fixed proportional relationship. As shown in FIG. 2e, locations of TX1, TX2, and TX3 to the intermediate line are respectively d, 3d, and 6d. In a folding process of the foldable screen, because of the hinge, the folding angle is on an extension line of two foldable screens. As shown in FIG. 2j, a reference numeral V in the figure represents a top angle location of the folding angle of the two foldable screens, and reference numerals o, p, and q represent locations of sensors that respectively constitute a loop with TX1, TX2, and TX3.

When the folding angle is smaller, a distance s1 between a sensor at a location indicated by the reference numeral o and TX1 decreases. Similarly, a distance s2 between a sensor at a location indicated by the reference numeral p and TX2 decreases, and a distance s3 between a sensor at a location indicated by the reference numeral q and TX3 decreases. However, because of the hinge, in the folding process of the foldable screen, speeds at which s1, s2, and s3 decrease are different. As shown in FIG. 2j, in the folding process of the foldable screen, a vertex V moves to the left continuously, and a ratio between d1, d2, and d3 changes accordingly (which is no longer 1:2:4 in a tiling state). Because a triangle constituted by V, o, and TX1, a triangle constituted by V, p, and TX2, and a triangle constituted by V, q, and TX3 are similar, in a case that the ratio between d1, d2, and d3 continuously changes, a ratio between s1, s2, and s3 also correspondingly changes, and data separately obtained from TX1, TX2, and TX3 also changes. The smaller the folding angle, the faster a change of the data obtained from TX3, which is finally equal to the data obtained from TX1 and TX2. When the foldable screen is completely folded, s1, s2, and s3 are equal. In this case, the data obtained from TX1, TX2, and TX3 are equal.

The folding angle shown in FIG. 2g is a small value, the data Raw3 received from TX3 is close to a data value received from TX1 and a data value received from TX2, and a ratio is changed to 1:1:1. Based on the foregoing principle, it may be learned that a ratio of data values received from TX1 and TX2 gradually changes from the original 1:2 to 1:1, and a ratio of data values received from TX2 and TX3 also gradually changes from 1:2 to 1:1. If a value that is not in this ratio range appears midway, it may be determined that the data is invalid data, and this part of data needs to be eliminated, thereby effectively improving recognition accuracy of the folding angle. That is, the determining the folding angle of the foldable screen according to the M sets of data includes:

filtering the M sets of data to obtain N sets of valid data, where N is an integer greater than or equal to 2 and less than or equal to M;

obtaining I pieces of output data of a target sensor at an adjacent sampling moment in the N sets of valid data, where I is an integer greater than or equal to 2 and less than or equal to N, and the target sensor includes at least one of the U first sensors; and determining the folding angle of the foldable screen according to the I pieces of output data.

As described above, when the M sets of data are filtered, it may be determined whether a ratio of each set of data is within a specific ratio range. For example, for three sensors that meet the first preset ratio, if a ratio of output data of the three sensors is within a range of 1:1:1 to 4:2:1, the set of data is retained; or if a ratio of output data of the three sensors is not within a range of 1:1:1 to 4:2:1, the set of data is eliminated.

The N sets of valid data are obtained after the filtering, and the I pieces of output data of the target sensor at the adjacent sampling moment are obtained from the N sets of valid data. For example, if the target sensor includes a first sensor, and the first sensor is one of at least two sensors, I pieces of output data of the first sensor at the adjacent sampling moment are obtained from the N sets of valid data. If the target sensor includes a first sensor and a second sensor, and both the first sensor and the second sensor are sensors in at least two sensors, I pieces of output data of the first sensor and I pieces of output data of the second sensor at the adjacent sampling moment are obtained from the N sets of valid data.

If the I pieces of output data include first output data, second output data, and third output data that are successively collected at adjacent moments, the second output data is greater than the first output data, and the second output data is less than the third output data, the determining the folding angle of the foldable screen according to the I pieces of output data includes: if a ratio of the first output data to the second output data to the third output data is within a preset ratio range, determining the folding angle of the foldable screen according to the preset ratio range.

In some implementations, if the ratio of the first output data to the second output data to the third output data is within a second preset ratio range, it is determined that the folding angle of the foldable screen is a first folding angle;

if the ratio of the first output data to the second output data to the third output data is within a third preset ratio range, it is determined that the folding angle of the foldable screen is a second folding angle; or if the ratio of the first output data to the second output data to the third output data is within a fourth preset ratio range, it is determined that the folding angle of the foldable screen is a third folding angle.

For example, the second preset ratio range may be set to 1:1:1 to 2:1.5:1, and the first folding angle is complete folding; the third preset ratio range is set to 2:1.5:1 to 3:2:1.5 and corresponds to a large folding angle; and the fourth preset ratio range is set to 3:2:1.5 to 4:2:1 and corresponds to a small folding angle.

When the folding angle is large, a plurality of scanning channels in an edge region may be selected; when the folding angle is small, one edge channel of the foldable screen may be closed; and when the foldable screen is completely folded, all scanning channels of the foldable screen may be closed, thereby effectively preventing accidental touch.

Figure 2H:
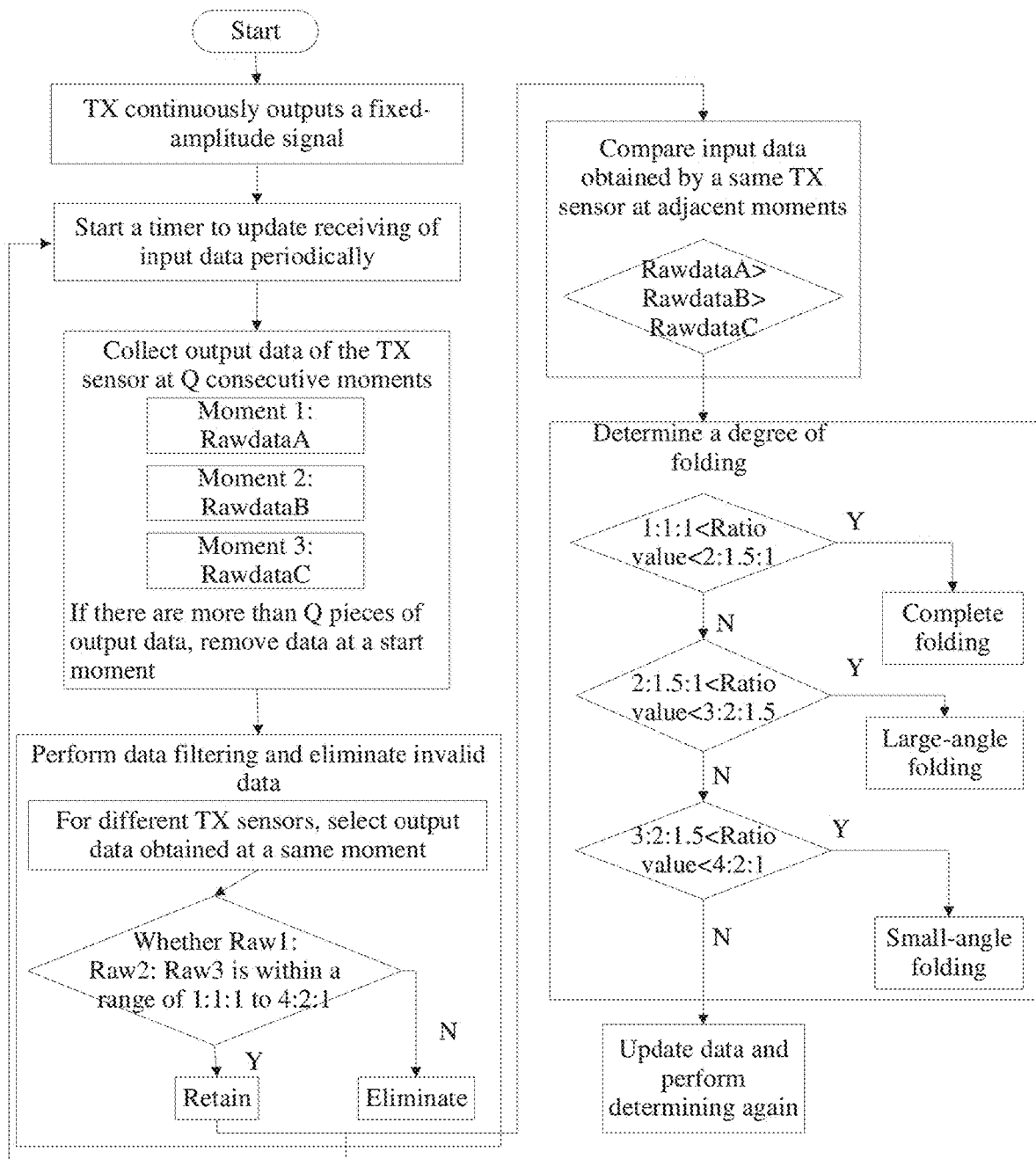
FIG. 2h is a flowchart of determining a folding angle according to an embodiment of this application.
Figure 2I:
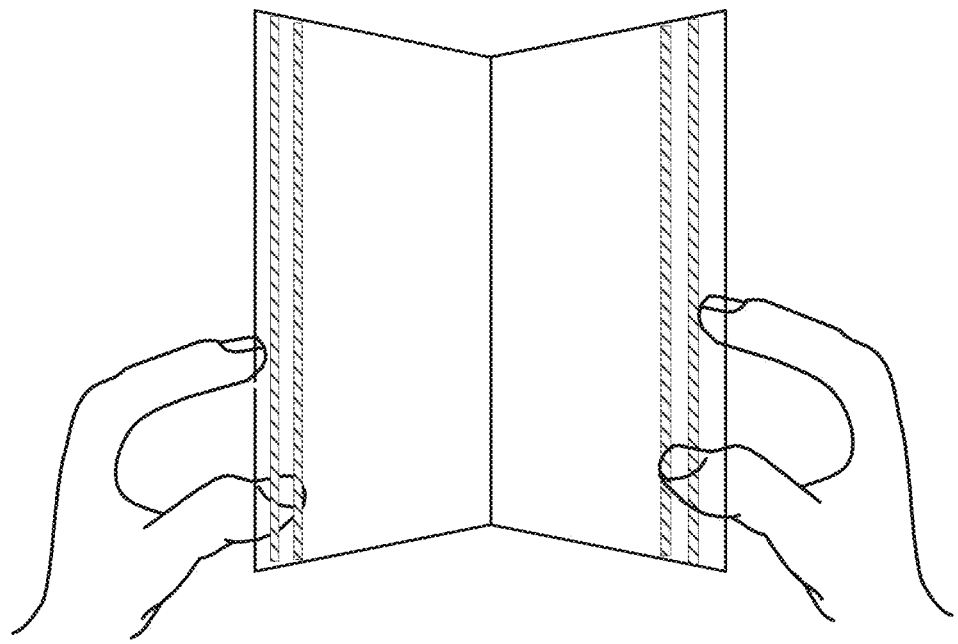
FIG. 2i is a schematic diagram of disabling a scanning channel of a foldable screen according to an embodiment of this application.
Figure 2J:
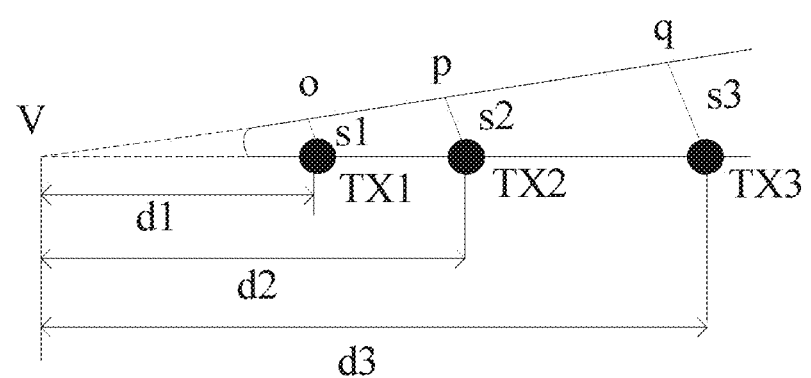
FIG. 2j is a schematic diagram of a foldable screen according to an embodiment of this application.

For the foregoing complete process, refer to the flowchart shown in FIG. 2h, where a ratio value is RawdataA:RawdataB:RawdataC.

In an embodiment of this application, before the obtaining output data of a sensor disposed on the foldable screen, the method further includes:

obtaining a capacitance variation value of the sensor, where a signal output channel and a signal receive channel intersect to form a sensor;
determining at least two target connected regions of the foldable screen according to the capacitance variation value, where the target connected region is a connected region composed of a sensor whose capacitance variation value exceeds a preset threshold; and
if the at least two target connected regions meet a preset condition, determining that the foldable screen is in a preset scenario; and
correspondingly, the obtaining output data of a sensor disposed on the foldable screen includes:
in a case that the foldable screen is in the preset scenario, obtaining the output data of the sensor disposed on the foldable screen.

In some implementations, it may be learned from a touch principle of the foldable screen that the left and right half screens of the foldable screen include uniformly distributed Indium Tin Oxide (ITO) sensors, that is, a TX (output signal) sensor and an RX (received signal) sensor. If there is touch on the foldable screen, a capacitance value between the ITO sensors is affected, and a touch location may be detected according to a change of the capacitance value. As shown in Table 1, a value in Table 1 represents a capacitance variation amount of each sensor (which may also be referred to as a capacitance node) on the foldable screen, and whether the preset scenario is met may be determined according to the change amount. The preset scenario may be an accidental touch scenario.

TABLE 1

| -2  | 3   | 4 | -2 | ... | 0 | 1  | -3 | 2   | 0   |
|-----|-----|---|----|-----|---|----|----|-----|-----|
| -3  | 0   | 1 | 2  | ... | 2 | -2 | 3  | 4   | 1   |
| 0   | -1  | 0 | 3  | ... | 4 | 5  | 1  | -5  | 3   |
| ... | ... | ...| ...| ... | ...| ...| ...| ...| ... |
| 54  | 3   | 0 | 1  | ... | 4 | 1  | 4  | 44  | 52  |
| 142 | 19  | 1 | 0  | ... | 2 | 2  | -2 | 139 | 151 |
| 96  | 10  | 0 | 1  | 2   | 4 | 0  | 2  | 90  | 134 |
| 23  | 5   | 0 | 2  | 5   | 0 | 3  | 3  | 10  | 89  |

For a sensor whose capacitance variation value exceeds a preset threshold, a connected region formed by these sensors may be used as a target connected region. In a case that at least two target connected regions are obtained, it is further determined whether the at least two target connected regions meet a preset condition. For example, the at least two target connected regions include a first connected region and a second connected region, and the preset condition includes at least one of the following:

the first connected region is located in a first preset region of the foldable screen, the second connected region is located in a second preset region of the foldable screen, and the first preset region and the second preset region are relative regions of the foldable screen, where in some implementations, the first preset region and the second preset region are relative regions of the foldable screen near an edge region;
in a same coordinate system, a horizontal coordinate range in which the first connected region is located intersects a horizontal coordinate range in which the second connected region is located, or in a same coordinate system, a vertical coordinate range in which the first connected region is located intersects a vertical coordinate range in which the second connected region is located; and
a capacitance variation value of a sensor located in a middle region of the foldable screen is less than the preset threshold, and the middle region is a region that is of the foldable screen and that is located between the first connected region and the second connected region.

As described above, a coordinate system may be established by using a location of any corner of the foldable screen as a coordinate origin, a length direction of the foldable screen as vertical coordinates, and a width direction of the foldable screen as horizontal coordinates, or a coordinate system may be established by using a center location of the foldable screen as a coordinate origin, a length direction of the foldable screen as vertical coordinates, and a width direction of the foldable screen as horizontal coordinates. This is not limited herein. The preset threshold may also be limited according to an actual situation.

As described above, whether the foldable screen meets the preset scenario is determined by using the capacitance variation value of the sensor, and subsequent anti-mistouch processing is performed only in a case that the preset scenario is met, thereby improving accuracy of anti-mistouch processing.

In the anti-mistouch method in this application, the folding angle may be determined based on the sensor of the foldable screen. Compared with a solution of detecting an angle by using another sensor, power consumption and costs can be reduced. In addition, in anti-mistouch processing, edge scanning of the touch screen is disabled, and accidental touch is avoided from a signal source, which is more thorough than other solutions.

It should be noted that the anti-mistouch method provided in the embodiments of this application may be performed by an anti-mistouch apparatus, or a control module that is in the anti-mistouch apparatus and that is configured to perform the anti-mistouch method. In the embodiments of this application, an example in which the anti-mistouch apparatus performs the anti-mistouch method is used to describe the anti-mistouch apparatus provided in the embodiments of this application.

Figure 3:
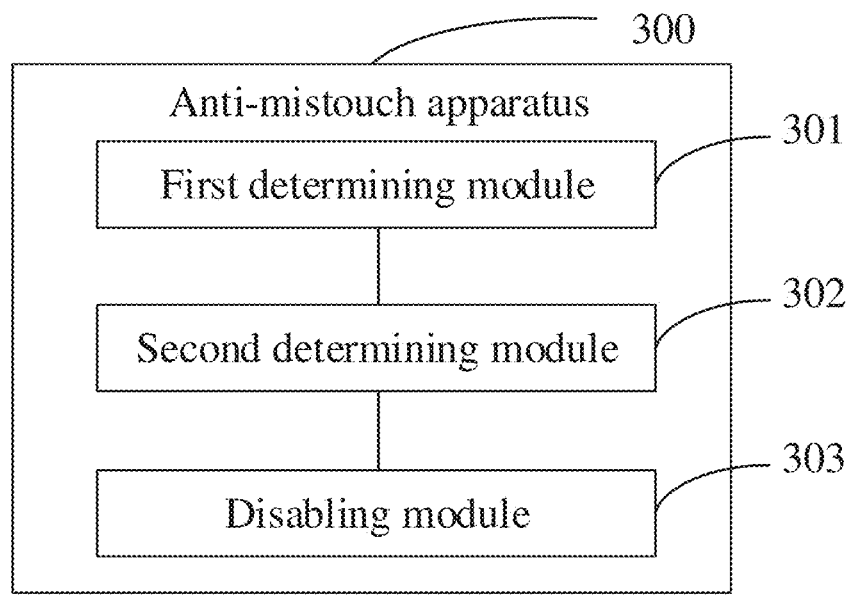
FIG. 3 is a block diagram of an anti-mistouch apparatus according to an embodiment of this application.

FIG. 3 shows an anti-mistouch apparatus according to an embodiment of this application. As shown in FIG. 3, an anti-mistouch apparatus 300 includes:

a first determining module 301, configured to determine a folding angle of a foldable screen of an electronic device;

a second determining module 302, configured to determine a target region of the foldable screen according to the folding angle; and a disabling module 303, configured to disable a touch response function of the target region of the foldable screen.

In some implementations, the first determining module 301 includes:

an obtaining submodule, configured to obtain output data of a sensor disposed on the foldable screen; and a determining submodule, configured to determine the folding angle of the foldable screen according to the output data.

In some implementations, the anti-mistouch apparatus 300 further includes:

an obtaining module, configured to obtain a capacitance variation value of the sensor, where a signal output channel and a signal receive channel intersect to form a sensor;

a third determining module, configured to determine at least two target connected regions of the foldable screen according to the capacitance variation value, where the target connected region is a connected region composed of a sensor whose capacitance variation value exceeds a preset threshold; and a fourth determining module, configured to: if the at least two target connected regions meet a preset condition, determine that the foldable screen is in a preset scenario; and correspondingly, the obtaining submodule is configured to:

in a case that the foldable screen is in the preset scenario, obtain the output data of the sensor disposed on the foldable screen.

In some implementations, the at least two target connected regions include a first connected region and a second connected region, and the preset condition includes at least one of the following:

the first connected region is located in a first preset region of the foldable screen, the second connected region is located in a second preset region of the foldable screen, and the first preset region and the second preset region are relative regions of the foldable screen;

in a same coordinate system, a horizontal coordinate range in which the first connected region is located intersects a horizontal coordinate range in which the second connected region is located, or in a same coordinate system, a vertical coordinate range in which the first connected region is located intersects a vertical coordinate range in which the second connected region is located; and a capacitance variation value of a sensor located in a middle region of the foldable screen is less than the preset threshold, and the middle region is a region that is of the foldable screen and that is located between the first connected region and the second connected region.

In some implementations, the obtaining submodule includes an obtaining unit; and the obtaining unit is configured to obtain M sets of data at M consecutive sampling moments, where each set of data includes output data of U sensors collected at one sampling moment, where the U first sensors are sensors located in a first region, and a ratio of distances between the U first sensors and an intermediate line is within a first preset ratio range, the intermediate line divides the foldable screen into the first region and a second region, the second region includes U second sensors, the U first sensors and the U second sensors are symmetrical with the intermediate line as a symmetric axis, the U first sensors are not grounded, the U second sensors are grounded, M is an integer greater than or equal to 2, and U is an integer greater than or equal to 2; and correspondingly, the determining submodule includes a determining unit; and the determining unit is configured to determine the folding angle of the foldable screen according to the M sets of data.

In some implementations, the determining unit includes:

a filtering subunit, configured to screen the M sets of data to obtain N sets of valid data, where N is an integer greater than or equal to 2 and less than or equal to M;

an obtaining subunit, configured to obtain I pieces of output data of a target sensor at an sampling moment in the N sets of valid data, where I is an integer greater than or equal to 2 and less than or equal to N, and the target sensor includes at least one of the U first sensors; and a determining subunit, configured to determine the folding angle of the foldable screen according to the I pieces of output data.

In some implementations, the I pieces of output data include first output data, second output data, and third output data that are successively collected at adjacent moments, the second output data is greater than the first output data, and the second output data is less than the third output data; and the determining subunit is configured to: if a ratio of the first output data to the second output data to the third output data is within a preset ratio range, determine the folding angle of the foldable screen according to the preset ratio range.

According to the anti-mistouch apparatus 300 in this embodiment, a folding angle of a foldable screen is determined; a target region of the foldable screen is determined according to the folding angle; and a touch response function of the target region of the foldable screen is disabled. The target region is determined according to the folding angle, so that the touch response function of the foldable screen in the target region is disabled, thereby effectively avoiding accidental touch.

The anti-mistouch apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a laptop computer, a palmtop computer, an in-vehicle electronic device, a wearable device, an Ultra-Mobile Personal Computer (UMPC), a netbook, or a Personal Digital Assistant (PDA). The non-mobile electronic device may be a server, a Network Attached Storage (NAS), a personal computer, a television, an automated teller machine, or a self-service machine. This is not specifically limited in this embodiment of this application.

The anti-mistouch apparatus in this embodiment of this application may be an apparatus with an operating system. The operating system may be an Android operating system, an iOS operating system, or another possible operating system. This is not specifically limited in this embodiment of this application.

The anti-mistouch apparatus provided in this embodiment of this application can implement the processes implemented in the method embodiment in FIG. 1. To avoid repetition, details are not described herein again.

Figure 4:
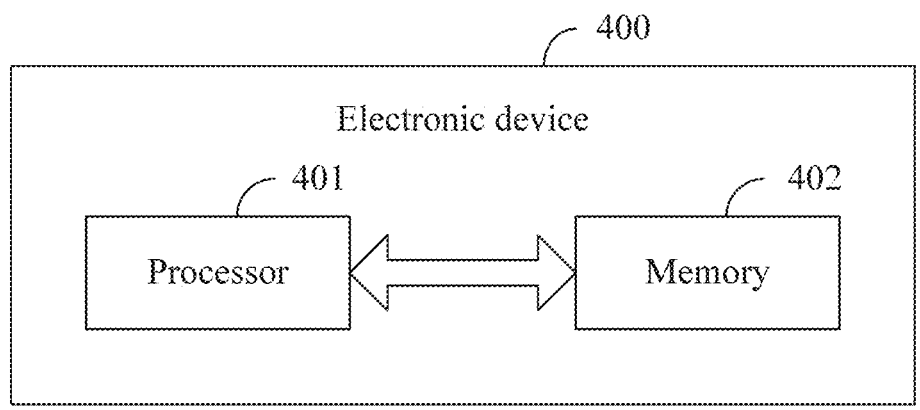
FIG. 4 is a block diagram of an electronic device according to an embodiment of this application.

In some implementations, as shown in FIG. 4, an embodiment of this application further provides an electronic device 400, including a processor 401, a memory 402, and a program or an instruction that is stored in the memory 402 and that can be run on the processor 401. When the program or the instruction is executed by the processor 401, the processes of the foregoing anti-mistouch method embodiment are implemented and a same technical effect can be achieved. To avoid repetition, details are not described herein again.

It should be noted that the electronic device in this embodiment of this application includes the foregoing mobile electronic device and the foregoing non-mobile electronic device.

Figure 5:
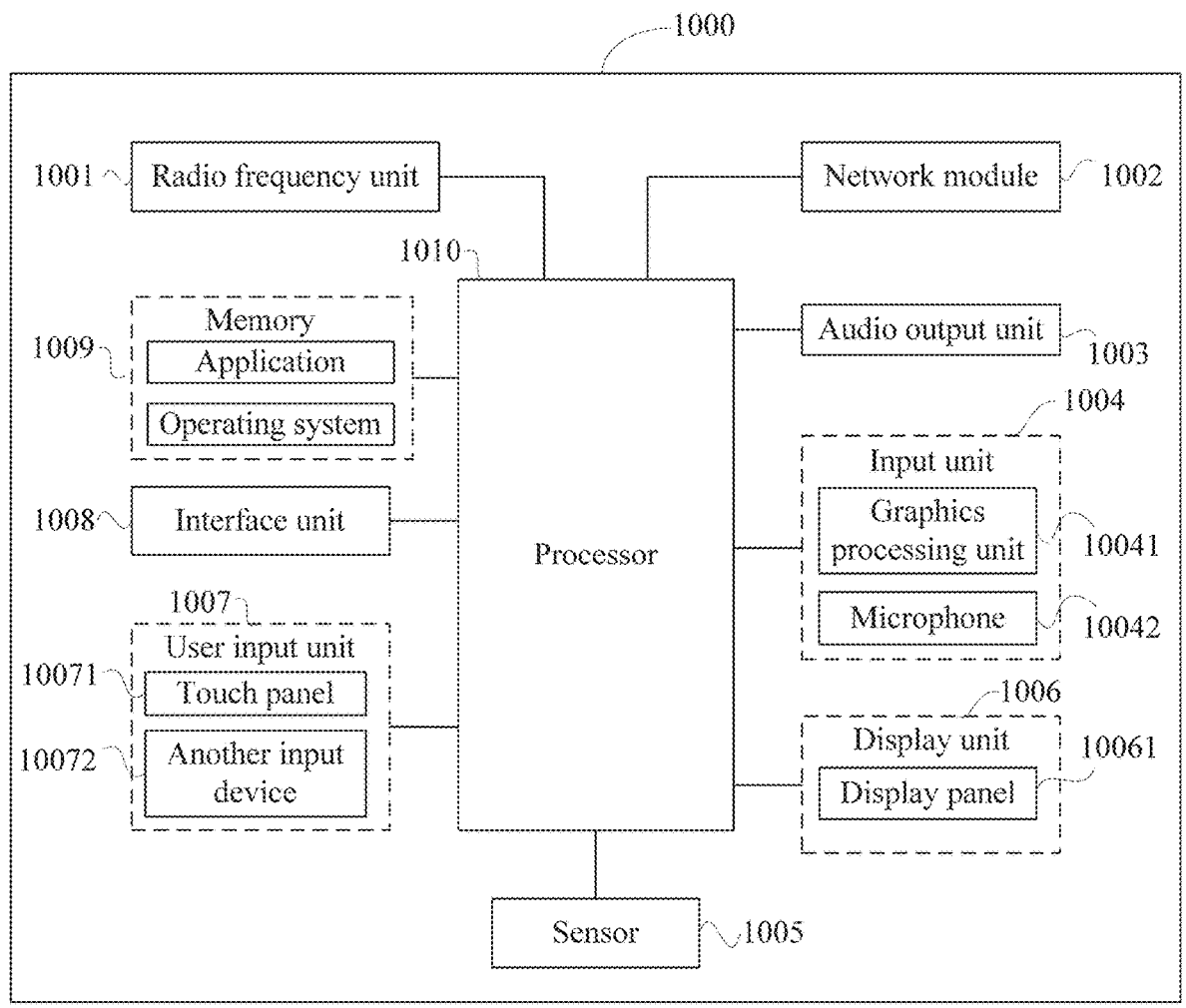
FIG. 5 is a block diagram of an electronic device according to an embodiment of this application.

FIG. 5 is a schematic structural diagram of hardware of an electronic device according to an embodiment of this application.

An electronic device 1000 includes but is not limited to components such as a radio frequency unit 1001, a network module 1002, an audio output unit 1003, an input unit 1004, a sensor 1005, a display unit 1006, a user input unit 1007, an interface unit 1008, a memory 1009, and a processor 1010.

A person skilled in the art can understand that the electronic device 1000 may further include a power supply (such as a battery) that supplies power to each component. The power supply may be logically connected to the processor 1010 by using a power supply management system, to implement functions such as charging and discharging management, and power consumption management by using the power supply management system. The structure of the electronic device shown in FIG. 5 does not constitute a limitation on the electronic device. The electronic device may include components more or fewer than those shown in the diagram, a combination of some components, or different component arrangements. Details are not described herein.

The processor 1010 is configured to: determine a folding angle of a foldable screen of an electronic device; determine a target region of the foldable screen according to the folding angle; and disable a touch response function of the target region of the foldable screen.

In this embodiment, the processor 1010 determines a folding angle of a foldable screen; determines a target region of the foldable screen according to the folding angle; and disables a touch response function of the target region of the foldable screen. The target region is determined according to the folding angle, so that the touch response function of the foldable screen in the target region is disabled, thereby effectively avoiding accidental touch.

In some implementations, the processor 1010 is further configured to obtain output data of a sensor disposed on the foldable screen; and
determine the folding angle of the foldable screen according to the output data.

In some implementations, the processor 1010 is further configured to: obtain a capacitance variation value of the sensor, where a signal output channel and a signal receive channel intersect to form a sensor;
determine at least two target connected regions of the foldable screen according to the capacitance variation value, where the target connected region is a connected region composed of a sensor whose capacitance variation value exceeds a preset threshold; and
if the at least two target connected regions meet a preset condition, determine that the foldable screen is in a preset scenario; and correspondingly, the processor 1010 is further configured to: in a case that the foldable screen is in the preset scenario, obtain the output data of the sensor disposed on the foldable screen.

In some implementations, the at least two target connected regions include a first connected region and a second connected region, and the preset condition includes at least one of the following:
the first connected region is located in a first preset region of the foldable screen, the second connected region is located in a second preset region of the foldable screen, and the first preset region and the second preset region are relative regions of the foldable screen;
in a same coordinate system, a horizontal coordinate range in which the first connected region is located intersects a horizontal coordinate range in which the second connected region is located, or in a same coordinate system, a vertical coordinate range in which the first connected region is located intersects a vertical coordinate range in which the second connected region is located; and
a capacitance variation value of a sensor located in a middle region of the foldable screen is less than the preset threshold, and the middle region is a region that is of the foldable screen and that is located between the first connected region and the second connected region.

In some implementations, the processor 1010 is further configured to obtain M sets of data at M consecutive sampling moments, where each set of data includes output data of U sensors collected at one sampling moment, where the U first sensors are sensors located in a first region, and a ratio of distances between the U first sensors and an intermediate line is within a first preset ratio range, the intermediate line divides the foldable screen into the first region and a second region, the second region includes U second sensors, the U first sensors and the U second sensors are symmetrical with the intermediate line as a symmetric axis, the U first sensors are not grounded, the U second sensors are grounded, M is an integer greater than or equal to 2, and U is an integer greater than or equal to 2; and
correspondingly, the processor 1010 is further configured to determine the folding angle of the foldable screen according to the M sets of data.

In some implementations, the processor 1010 is further configured to: screen the M sets of data to obtain N sets of valid data, where N is an integer greater than or equal to 2 and less than or equal to M; obtain I pieces of output data of a target sensor at an adjacent sampling moment in the N sets of valid data, where I is an integer greater than or equal to 2 and less than or equal to N, and the target sensor includes at least one of the U first sensors; and determine the folding angle of the foldable screen according to the I pieces of output data.

In some implementations, the I pieces of output data include first output data, second output data, and third output data that are successively collected at adjacent moments, the second output data is greater than the first output data, and the second output data is less than the third output data; and
the processor 1010 is further configured to: if a ratio of the first output data to the second output data to the third output data is within a preset ratio range, determine the folding angle of the foldable screen according to the preset ratio range.

It should be understood that, in this embodiment of this application, the input unit 1004 may include a Graphics Processing Unit (GPU) 10041 and a microphone 10042, and the graphics processing unit 10041 processes image data of a still picture or a video obtained by an image capture apparatus (such as a camera) in a video capture mode or an image capture mode. The display unit 1006 may include a display panel 10061. In some implementations, the display panel 10061 may be configured in a form such as a liquid crystal display or an organic light-emitting diode. The user input unit 1007 includes a touch panel 10071 and another input device 10072. The touch panel 10071 is also referred to as a touchscreen. The touch panel 10071 may include two parts: a touch detection apparatus and a touch controller. The another input device 10072 may include but is not limited to a physical keyboard, a functional button (such as a volume control button or a power on/off button), a trackball, a mouse, and a joystick. Details are not described herein. The memory 1009 may be configured to store a software program and various data, including but not limited to an application and an operating system. An application processor and a modem processor may be integrated into the processor 1010, the application processor mainly processes an operating system, a user interface, an application, and the like, and the modem processor mainly processes wireless communication. It can be understood that, alternatively, the modem processor may not be integrated into the processor 1010.

An embodiment of this application further provides a readable storage medium. The readable storage medium stores a program or an instruction, and the readable storage medium may be volatile or non-volatile. The program or the instruction is executed by a processor to implement the processes of the foregoing anti-mistouch method embodiment and a same technical effect can be achieved. To avoid repetition, details are not described herein again.

The processor is a processor in the electronic device in the foregoing embodiment. The readable storage medium includes a computer-readable storage medium, such as a computer Read-Only Memory (ROM), a Random Access Memory (RAM), a magnetic disk, or an optical disc.

An embodiment of this application further provides a chip. The chip includes a processor and a communication interface, the communication interface is coupled to the processor, and the processor is configured to run a program or an instruction to implement the processes of the foregoing anti-mistouch method embodiment, and a same technical effect can be achieved. To avoid repetition, details are not described herein again.

It should be understood that the chip mentioned in this embodiment of this application may also be referred to as a system-level chip, a system chip, a chip system, or an on-chip system chip.

An embodiment of this application further provides a computer software product. The computer software product is stored in a non-transient storage medium, and the computer software product is executed by at least one processor to implement the processes of the method embodiment shown in FIG. 1, and a same technical effect can be achieved. To avoid repetition, details are not described herein again.

It should be noted that, in this specification, the terms "include," "comprise," or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "including a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may understand that the method in the foregoing embodiment may be implemented by software in addition to a necessary universal hardware platform or by hardware only. Based on such an understanding, the technical solutions of this application essentially or the part contributing to the prior art may be implemented in a form of a computer software product. The computer software product is stored in a storage medium (such as a ROM/RAM, a hard disk, or an optical disc), and includes several instructions for instructing a terminal (which may be a mobile phone, a computer, a server, a network device, or the like) to perform the methods described in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. An anti-mistouch method, comprising:
   determining a folding angle of a foldable screen of an electronic device based on output data of a sensor unit comprising a first sensor and a second sensor wherein the foldable screen is foldable along an intermediate line and the first sensor and the second sensor are symmetrical with respect to the intermediate line;
   determining a target region of the foldable screen according to the folding angle; and
   disabling a touch response function of the target region of the foldable screen,
   wherein the first sensor is not grounded and the second sensor is grounded, wherein sensor unit further comprises a first capacitor connected between the first sensor and the ground, and a second capacitor connected between the first sensor and a ground capacitor connected to the ground, and the output data is an output from the non-grounded end of the ground capacitor.

2. The anti-mistouch method according to claim 1, wherein the determining a folding angle of a foldable screen of an electronic device based on the output data of the sensor unit comprising the first sensor and the second sensor comprises:
   obtaining the output data of the sensor unit disposed on the foldable screen; and
   determining the folding angle of the foldable screen according to the output data.

3. The anti-mistouch method according to claim 2, wherein before the obtaining the output data of the sensor unit disposed on the foldable screen, the method further comprises:

obtaining a capacitance variation value of the sensor unit;

determining at least two target connected regions of the foldable screen according to the capacitance variation value, wherein the target connected region is a connected region composed of a sensor whose capacitance variation value exceeds a preset threshold; and when the at least two target connected regions meet a preset condition, determining that the foldable screen is in a preset scenario, wherein the obtaining the output data of the sensor unit disposed on the foldable screen comprises:

when the foldable screen is in the preset scenario, obtaining the output data of the sensor unit disposed on the foldable screen.

4. The anti-mistouch method according to claim 3, wherein the at least two target connected regions comprise a first connected region and a second connected region, and the preset condition comprises at least one of the following:

the first connected region is located in a first preset region of the foldable screen, the second connected region is located in a second preset region of the foldable screen, and the first preset region and the second preset region are relative regions of the foldable screen;

in a same coordinate system, a horizontal coordinate range in which the first connected region is located intersects a horizontal coordinate range in which the second connected region is located, or in a same coordinate system, a vertical coordinate range in which the first connected region is located intersects a vertical coordinate range in which the second connected region is located; or a capacitance variation value of a sensor located in a middle region of the foldable screen is less than the preset threshold, and the middle region is a region that is of the foldable screen and that is located between the first connected region and the second connected region.

5. The anti-mistouch method according to claim 2, wherein the obtaining the output data of the sensor unit disposed on the foldable screen comprises:

obtaining M sets of data at M consecutive sampling moments, wherein each set of data comprises output data of U first sensors collected at one sampling moment, wherein a ratio of distances between the U first sensors and the intermediate line is within a first preset ratio range, and M is an integer greater than or equal to 2, and wherein the determining the folding angle of the foldable screen according to the output data comprises:

determining the folding angle of the foldable screen according to the M sets of data.

6. The anti-mistouch method according to claim 5, wherein the determining the folding angle of the foldable screen according to the M sets of data comprises:

filtering the M sets of data to obtain N sets of valid data, wherein N is an integer greater than or equal to 2 and less than or equal to M;

obtaining I pieces of output data of a target sensor at an adjacent sampling moment in the N sets of valid data, wherein I is an integer greater than or equal to 2 and less than or equal to N, and the target sensor comprises at least one of the U first sensors; and determining the folding angle of the foldable screen according to the I pieces of output data.

7. The anti-mistouch method according to claim 6, wherein the I pieces of output data comprise first output data, second output data, and third output data that are successively collected at adjacent moments, the second output data is greater than the first output data, and the second output data is less than the third output data, and wherein the determining the folding angle of the foldable screen according to the I pieces of output data comprises:

when a ratio of the first output data to the second output data to the third output data is within a preset ratio range, determining the folding angle of the foldable screen according to the preset ratio range.

8. An electronic device, comprising: a processor, a memory, and a program or an instruction that is stored in the memory and that is configured to be run on the processor, wherein the program or the instruction is configured to be executed by the processor to implement an anti-mistouch method comprising:

determining a folding angle of a foldable screen of the electronic device based on output data of a sensor unit comprising a first sensor and a second sensor, wherein the foldable screen is foldable along an intermediate line and the first sensor and the second sensor are symmetrical with respect to the intermediate line;

determining a target region of the foldable screen according to the folding angle; and disabling a touch response function of the target region of the foldable screen, wherein the first sensor is not grounded and the second sensor is grounded, wherein sensor unit further comprises a first capacitor connected between the first sensor and the ground, and a second capacitor connected between the first sensor and a ground capacitor connected to the ground, and the output data is an output from the non-grounded end of the ground capacitor.

9. The electronic device according to claim 8, wherein the determining a folding angle of a foldable screen of the electronic device based on the output data of the sensor unit comprising the first sensor and the second sensor comprises:

obtaining the output data of the sensor unit disposed on the foldable screen; and determining the folding angle of the foldable screen according to the output data.

10. The electronic device according to claim 9, wherein before the obtaining the output data of the sensor unit disposed on the foldable screen, the anti-mistouch method further comprises:

obtaining a capacitance variation value of the sensor unit;

determining at least two target connected regions of the foldable screen according to the capacitance variation value, wherein the target connected region is a connected region composed of a sensor whose capacitance variation value exceeds a preset threshold; and when the at least two target connected regions meet a preset condition, determining that the foldable screen is in a preset scenario, wherein the obtaining the output data of the sensor unit disposed on the foldable screen comprises:

when the foldable screen is in the preset scenario, obtaining the output data of the sensor unit disposed on the foldable screen.

11. The electronic device according to claim 10, wherein the at least two target connected regions comprise a first connected region and a second connected region, and the preset condition comprises at least one of the following:

the first connected region is located in a first preset region of the foldable screen, the second connected region is located in a second preset region of the foldable screen, and the first preset region and the second preset region are relative regions of the foldable screen;

in a same coordinate system, a horizontal coordinate range in which the first connected region is located intersects a horizontal coordinate range in which the second connected region is located, or in a same coordinate system, a vertical coordinate range in which the first connected region is located intersects a vertical coordinate range in which the second connected region is located; or a capacitance variation value of a sensor located in a middle region of the foldable screen is less than the preset threshold, and the middle region is a region that is of the foldable screen and that is located between the first connected region and the second connected region.

12. The electronic device according to claim 9, wherein the obtaining output the data of the sensor unit disposed on the foldable screen comprises:

obtaining M sets of data at M consecutive sampling moments, wherein each set of data comprises output data of U first sensors collected at one sampling moment, wherein a ratio of distances between the U first sensors and the intermediate line is within a first preset ratio range, and M is an integer greater than or equal to 2, and wherein the determining the folding angle of the foldable screen according to the output data comprises:

determining the folding angle of the foldable screen according to the M sets of data.

13. The electronic device according to claim 12, wherein the determining the folding angle of the foldable screen according to the M sets of data comprises:

filtering the M sets of data to obtain N sets of valid data, wherein N is an integer greater than or equal to 2 and less than or equal to M;

obtaining I pieces of output data of a target sensor at an adjacent sampling moment in the N sets of valid data, wherein I is an integer greater than or equal to 2 and less than or equal to N, and the target sensor comprises at least one of the U first sensors; and determining the folding angle of the foldable screen according to the I pieces of output data.

14. The electronic device according to claim 13, wherein the I pieces of output data comprise first output data, second output data, and third output data that are successively collected at adjacent moments, the second output data is greater than the first output data, and the second output data is less than the third output data, and wherein the determining the folding angle of the foldable screen according to the I pieces of output data comprises:

when a ratio of the first output data to the second output data to the third output data is within a preset ratio range, determining the folding angle of the foldable screen according to the preset ratio range.

15. A non-transitory computer-readable medium, wherein a program or an instruction is stored on the computer-readable medium, and the program or the instruction is executed by a processor to implement an anti-mistouch method comprising:

determining a folding angle of a foldable screen of an electronic device based on output data of a sensor unit comprising a first sensor and a second sensor, wherein the foldable screen is foldable along an intermediate line and the first sensor and the second sensor are symmetrical with respect to the intermediate line;

determining a target region of the foldable screen according to the folding angle; and disabling a touch response function of the target region of the foldable screen, wherein the first sensor is not grounded and the second sensor is grounded, wherein sensor unit further comprises a first capacitor connected between the first sensor and the ground, and a second capacitor connected between the first sensor and a ground capacitor connected to the ground, and the output data is an output from the non-grounded end of the ground capacitor.

16. The non-transitory computer-readable medium according to claim 15, wherein the determining a folding angle of a foldable screen of an electronic device based on the output data of the sensor unit comprising the first sensor and the second sensor comprises:

obtaining the output data of the sensor unit disposed on the foldable screen; and determining the folding angle of the foldable screen according to the output data.

17. The non-transitory computer-readable medium according to claim 16, wherein before the obtaining the output data of the sensor unit disposed on the foldable screen, the anti-mistouch method further comprises:

obtaining a capacitance variation value of the sensor unit;

determining at least two target connected regions of the foldable screen according to the capacitance variation value, wherein the target connected region is a connected region composed of a sensor whose capacitance variation value exceeds a preset threshold; and when the at least two target connected regions meet a preset condition, determining that the foldable screen is in a preset scenario, wherein the obtaining the output data of the sensor unit disposed on the foldable screen comprises:

when the foldable screen is in the preset scenario, obtaining the output data of the sensor unit disposed on the foldable screen.

18. The non-transitory computer-readable medium according to claim 17, wherein the at least two target connected regions comprise a first connected region and a second connected region, and the preset condition comprises at least one of the following:

the first connected region is located in a first preset region of the foldable screen, the second connected region is located in a second preset region of the foldable screen, and the first preset region and the second preset region are relative regions of the foldable screen;

in a same coordinate system, a horizontal coordinate range in which the first connected region is located intersects a horizontal coordinate range in which the second connected region is located, or in a same coordinate system, a vertical coordinate range in which the first connected region is located intersects a vertical coordinate range in which the second connected region is located; or a capacitance variation value of a sensor located in a middle region of the foldable screen is less than the preset threshold, and the middle region is a region that is of the foldable screen and that is located between the first connected region and the second connected region.

19. The non-transitory computer-readable medium according to claim 16, wherein the obtaining the output data of the sensor unit disposed on the foldable screen comprises:
obtaining M sets of data at M consecutive sampling moments, wherein each set of data comprises output data of U first sensors collected at one sampling moment,
wherein a ratio of distances between the U first sensors and the intermediate line is within a first preset ratio range, and M is an integer greater than or equal to 2, and
wherein the determining the folding angle of the foldable screen according to the output data comprises:
determining the folding angle of the foldable screen according to the M sets of data.

20. The non-transitory computer-readable medium according to claim 19, wherein the determining the folding angle of the foldable screen according to the M sets of data comprises:
filtering the M sets of data to obtain N sets of valid data, wherein N is an integer greater than or equal to 2 and less than or equal to M;
obtaining I pieces of output data of a target sensor at an adjacent sampling moment in the N sets of valid data, wherein I is an integer greater than or equal to 2 and less than or equal to N, and the target sensor comprises at least one of the U first sensors; and
determining the folding angle of the foldable screen according to the I pieces of output data.

* * * * *